Nov. 18, 1930.  J. LEDWINKA  1,782,239
MEANS FOR ATTACHING UPHOLSTERY IN AUTOMOBILE BODIES
Filed Sept. 30, 1924  2 Sheets-Sheet 1
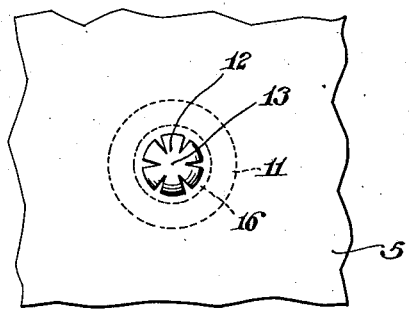
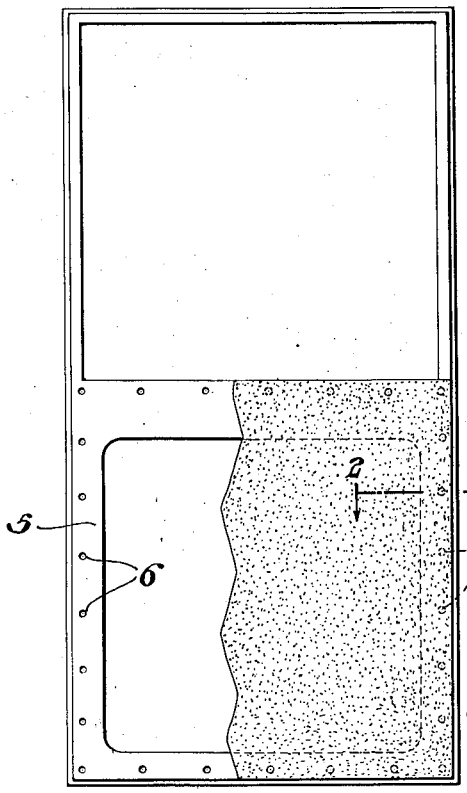
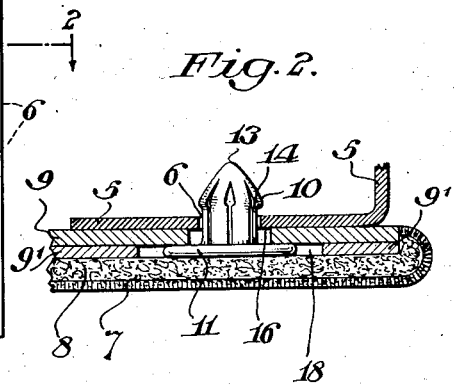
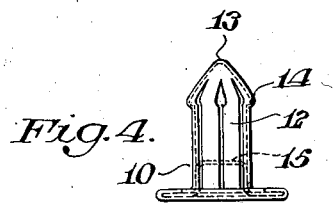
INVENTOR.
Joseph Ledwinka
BY Samuel E. Darby
ATTORNEY.

Nov. 18, 1930.   J. LEDWINKA   1,782,239
MEANS FOR ATTACHING UPHOLSTERY IN AUTOMOBILE BODIES
Filed Sept. 30, 1924   2 Sheets-Sheet 2
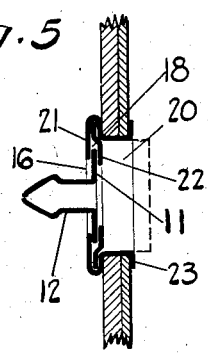
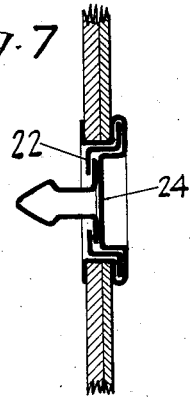
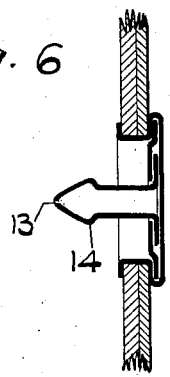
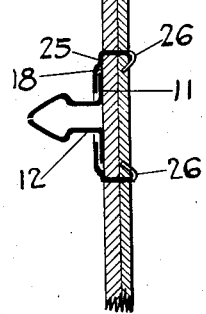
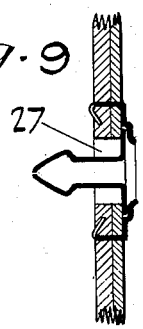
INVENTOR.
Joseph Ledwinka
BY Samuel E. Darby
ATTORNEY.

Patented Nov. 18, 1930

1,782,239

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

MEANS FOR ATTACHING UPHOLSTERY IN AUTOMOBILE BODIES

Application filed September 30, 1924. Serial No. 740,795.

This invention relates to means for attaching upholstery in automobile bodies.

The object of the invention is to provide means which are simple in structure and efficient in use for securing the trim or upholstery in automobile bodies and more especially in all metal bodies.

A further object of the invention is to provide an upholstery attaching means of the nature and character referred to wherein the fastener part of the attaching means is concealed from view.

A further object is to provide an attaching means for automobile body upholstery or trim in which relative adjustment or displacement of the fastening device with relation to the upholstery or trim is permitted whereby the upholstery or trim may be properly applied and retained in smooth, unwrinkled condition against the inner surface of the body or door paneling, even though the holes for receiving such fastening device may not be accurately or uniformly located.

A further object is to provide an attaching means of the nature and character, and for the purposes referred to whereby the application of the upholstery or trim to an automobile body may be accomplished expeditiously and satisfactorily without wrinkling or spoiling the smoothness and neat appearance thereof.

Other objects of the invention will appear more fully hereinafter.

The invention consists substantially in the construction, combination, location and relative arrangement of parts, all as will be more fully hereinafter set forth, as illustrated in the accompanying drawing, and finally pointed out in the appended claims.

In the accompanying drawing:

Fig. 1 is a view in elevation of the inner side of a door for an automobile body of the closed type, illustrating the application thereto of the upholstery or trim in accordance with the principles of my invention.

Fig. 2 is a much enlarged broken view in section on the line 2, 2, Fig. 1, looking in the direction of the arrows.

Fig. 3 is a correspondingly enlarged broken view illustrating in plan the manner of applying a fastening device to the upholstery or trim for attachment to an automobile body.

Fig. 4 is an enlarged detached detail view of one form of fastener I have found to be suitable for use in carrying out the principles of my invention.

Figs. 5 to 9 are transverse sections of several modifications of my invention.

It is a common practice to apply trim or upholstery to the inner surface of the doors, panels, seats and the like for automobile bodies. In the case of composite bodies where the frames for the body, seats, doors and the like are of wood the application of the upholstery or trim presents no serious problem since ordinary wood screw fastening devices may be employed for the purpose without difficulty. In the case of all-metal bodies, however, it is not practical to employ screws for securing the trim or upholstery for the reason that holes to receive the trim fastening screws must be drilled in the metal panels or frames of the body and these must be accurately placed to correspond with similar screw holes in the trim, but it is impossible to accurately predetermine the position of the screw holes in the upholstery so as to correspond accurately with the previously drilled holes in the body, door, panel or the like. Any variance in the registry of the screws, or other form of fastening device attached to the upholstery, with the holes in the body panels or frames causes wrinkling of the upholstery and this spoils its appearance and is unsightly and objectionable.

It is among the special purposes of my present invention to avoid the objections noted, and others, and to provide an upholstery attaching means wherein the fastening devices are so connected and secured to the trim or upholstery as to be capable of movement with relation to such trim or upholstery, so that in applying the trim or upholstery wrinkling is prevented even though there may be slightly inaccurate relative positioning of the fastening devices and the holes in the body panel or frame. I also propose to so mount the fastening devices in the upholstery that they will be concealed from view when the upholstery is applied. I also propose to employ a fastening device which can be readily and easily snapped into the holes formed in the panels or framework of the body, door or the like, and retained in place by spring action after the fashion of a glove fastener.

In the accompanying drawing, I have shown, as one practical embodiment of my invention the application of trim or upholstery to the inner panel of a door. It is to be understood of course that this is merely an illustrative application of my invention and is not to be regarded as a limitation. The inner panel of the door is designated by the reference numeral 5, and holes to receive the fastening devices are formed therein as indicated at 6. The trim or upholstery may be of any desired structure or nature. For merely illustrative purposes, I have shown an upholstery or trim consisting of a layer of plush material indicated at 7, of felt or other filling material 8, and of two layers of card board 9 and 9'. The plush layer in this instance, is shown as forming the wearing surface of the trim, that is, the surface which is presented towards the inside of the car body, while the felt layer is interposed between the plush and card board layers. If desired, the plush layer may be folded over so as to embrace the felt and card board layers. As above stated, however, any desired character of upholstery or trim may be employed.

The fastening device is indicated generally by reference numeral 10, (see Fig. 4), and it is stamped up out of sheet metal to form a rim or head portion 11 and a central stem portion 12, the latter comprising spring arms which are pressed into shape to form a somewhat blunt end 13. The stem 12 is formed with a portion near the blunt end thereof, as indicated at 14, of larger diameter than the remaining portion of the stem. This enlarged portion or bulge is designed to be somewhat compressed when the blunt end, 13, of the fastener is forced into a receiving hole 6 of the body panel or frame 5, so as to snap into securing position and to be retained in place, as clearly indicated in Fig. 2. If desired, and, as shown, a central reinforcing and stem bracing cup-shaped portion 15, may be pressed up into the interior of the fastening device from the rim or head 11.

In applying the fastener device 10 to the upholstery, the head or rim 11 is mounted within the body of the trim or upholstery so as to be concealed from view. In the illustrative arrangement shown, this rim or head is imbedded within the felt or filler material or layer 8, with the stem portion 12 thereof projecting through openings 16 in the layers, card board, plush or the like, which are interposed between the panel or frame and the felt or filler material in which the rim or head 11 is imbedded. It will be observed that the opening 16 in the trim or upholstery through which the stem 12 of the fastening device extends is of larger area than the circumferential dimension of the stem 12 and, if desired, the seat which receives the head 11 may also be of greater area than the head thereby providing the space 18. This is a most important and valuable feature of my invention since it permits lateral shifting of the fastening device in any direction in the trim or upholstery, thereby enabling the fastener to accommodate itself to any slight inaccuracy of alignment or registry thereof with the receiving hole in the body panel or frame without causing any wrinkling of the wearing surface of the trim or upholstery. In other words, after the fastener end is snapped into a hole in the panel or frame, the upholstery may be shifted relatively to the fastener thereby preventing wrinkling.

From the foregoing description, it will be seen that I provide an exceedingly simple and efficient means by which the trim or upholstery can be readily and easily applied and detached, and wherein provision is made for lateral shifting of the fastening device with reference to the trim or upholstery, to prevent wrinkling of the trim or upholstery and to insure a plain, smooth, neat-appearing surface, and wherein the fastening device is concealed from view.

The Figures 5 to 9 are vertical sections of modified forms of my invention in which the seating openings 16 and 18, and the retaining socket for the fastening device 10, are formed not in the cardboard which constitutes the foundation for the plush upholstery, but in metallic retaining members which are secured to the cardboard. The idea of these modifications is to make a structurally complete combined fastening device and carrying socket therefor which may be manufactured in quantity ready for attachment to the upholstery foundation.

In the form shown in Figures 5, 6 and 7, the body of the socket is in each case constituted by an eyelet 20. The eyelet 20 has one of its heads ready formed and reversely bent, as indicated at 21. The other head, however, is initially unformed, as indicated in dotted lines in Fig. 5. Between the branches of the reversely bent head 21 is seated a washer 22, the central area of which is deflected from its seated periphery in such manner as to form, between the central portion and the reversely bent head 21, the socket 18 which carries the rim or head 11 of the fastening device with sufficient clearance to permit the play desired. Either or both the reversely bent head 21 and the washer 22 are centrally apertured to permit outward projection and play of the stem 12 of device 10. Supplied in the form shown in Figure 5, with the exception that the one head 23 is left unformed as in the case of commercial eyelets, one needs but to inset the body of eyelet 20 into a perforation in the cardboard foundation, and form over head 23 by any suitable eyeleting tool.

The form of Figure 5 projects the stem 12 exteriorly of the body of eyelet 20, while the form of Figures 6 and 7 projects it interiorly of the body 20, the neck 12 being made of such length that the engaging end 13, 14 is projected beyond the body of the cardboard. In Figures 6 and 7, stem 12 extends all the way through the body 20, the inturned head 21 being flat and washer 22 lying closely adjacent thereto. In the form of Figure 7, however, the reversely bent head 21 is inwardly depressed at 24, and the washer accordingly offset to a greater extent to position the rim 11 well within the body 20 of the eyelet whereby stem 12 of fastening device 10 may be shorter or, if of the greater length as indicated in Figure 6, it will be projected farther from the face of the cardboard.

Modifications of Figures 8 and 9 differ from those of Figures 5 and 7 in that instead of constituting fastening device 10 and its associated sockets, a unitary article of manufacture, there are used metallic retaining members which cooperate with the cardboard foundation to form the sockets. The form of Fig. 8 comprises a washer 25, the central portion of which is offset to form between itself and the cardboard the socket opening 18 receiving the rim 11. The washer is centrally apertured to accommodate with sufficient play the neck 12. In this form, the neck 12 is projected away from the cardboard whereby no perforations have to be formed in it. But the washers 25 are provided with sharp prongs 26 which are pushed through the cardboard and clinched behind it.

The form of Figure 9 is essentially similar except that instead of projecting free of the cardboard, the stem 12 of the fastening device is turned in the opposite direction through a perforation 27 of less diameter than the washer.

While I have described my invention for use in applying trim or upholstery to the panels or frames of all-metal automobile bodies, doors or the like, it is to be understood that I do not confine myself to this particular use since the same principles are equally applicable to the application of trim or upholstery to other structures and situations with a realization of the advantages and benefits thereof. Nor do I confine myself to the modifications shown since others which no more depart from the generic spirit of my invention than these here delineated are sure to be evolved by those skilled in the art.

What I claim is:

1. In an upholstery attaching means, a fastening device having a head and a stem, said head being disposed for lateral movement in any direction within the body of the upholstery, and the stem extending through an opening in one side of the upholstery, said opening being of greater size than said stem, and a frame or panel having an opening therein to receive the projecting end of the stem.

2. The combination with a frame or panel having a hole formed therein, and upholstery to be applied to said panel or frame, of a fastener having a head concealed within the body of the upholstery and a headed stem projecting through an enlarged opening in one side of the upholstery, the head of said stem adapted to be engaged in the hole in said frame or panel, whereby said fastener is freely movable laterally in all directions with reference to the upholstery for alignment with said hole.

3. The combination with a frame or panel having a hole therein, and upholstery material, of a fastener having a head laterally adjustable in any direction enclosed within the upholstery material and a stem carried by said head projecting through an enlarged opening in one side of the upholstery material, said stem having an enlarged resilient end adapted to be snapped into the hole in the frame or panel.

4. An upholstery installation comprising, in combination, a frame supporting a plurality of separable fastener elements, and an upholstered backing supporting a plurality of fastener elements for engagement with the fastener elements on said frame thereby to secure said upholstery part to said frame, some of said fastener elements being fixed relative to their support while their cooperating elements are connected to their support by means permitting them to be freely laterally shiftable in any direction in one plane relative to their support for alignment and engagement with said fixed fastener elements.

5. An upholstery installation comprising, in combination, a frame having a plurality of stud-receiving apertures therein, an upholstered backing for said frame and a plurality of socket-engaging studs supported by said upholstered backing by a lost motion connection permitting said studs to be shiftable transversely relative to said backing in any direction to permit alignment and engagement thereof with said apertures thereby to detachably secure said backing to said frame.

6. An upholstery installation comprising, in combination, a frame presenting a plurality of stud-receiving apertures, an upholstered backing for covering said frame, a plurality of studs mounted in enlarged openings in said backing to permit them to be laterally shiftable in any direction in one plane relative to said backing and attaching means located at the outer face of said backing to position said studs relative to said backing while permitting said lateral shifting thereof for alignment and engagement with said apertures in said frame.

7. An upholstered part including a form, a plurality of fastener elements carried by said form, and means securing said fastener elements to said form by a lost motion connection to permit lateral shifting in one plane in any direction relative thereto, for securing said part to a frame.

8. An upholstered part including a backing, a plurality of fastener studs carried thereby, and means securing said fastener studs to said backing by a lost motion connection to permit lateral shifting in one plane in any direction relative thereto for securing said part to a frame.

9. An upholstered part including a backing having a plurality of apertures spaced about and adjacent the periphery thereof and a plurality of studs having heads and base flanges, the heads adapted to pass through said apertures to project at the opposite side of said backing from the base flanges, each of said heads having a cross sectional area substantially less than the cross sectional area of the aperture in the backing through which it passes, thereby to permit transverse movement of said stud in any direction relative to said aperture.

10. An upholstered part, comprising, in combination, a relatively stiff backing having an aperture therethrough, a stud having a base flange larger than said aperture, a protruding stud portion projecting from said base flange and presenting a head, a neck and a shank, said shank in the plane of said backing and of a size substantially smaller than said aperture, said head and neck of said stud projecting from the opposite side of said backing from said base flange, whereby said head and neck may shift relative to said backing to compensate for errors in alignment with a cooperating stud receiving part.

11. An upholstered part comprising, in combination, a relatively stiff backing having an aperture therethrough, a stud having a base flange larger than said aperture, attaching means separate from said base flange for holding said stud in said aperture, a protruding stud portion projecting from said base flange and presenting a head, a neck and a shank, said shank in the plane of said backing and of a size substantially smaller than said aperture, said head and neck of said stud projecting from the opposite side of said backing from said base flange, whereby said head and neck may shift relative to said backing to compensate for errors in alignment with a cooperating stud-receiving part.

12. In an upholstery installation, the combination of a frame, an upholstered backing and a fastener securing said frame and backing together, said fastener comprising a device secured to one part of said installation, an instrumentality on the other part of said installation engaging said device, and means connecting said device to said installation to permit the device to be freely shifted in any direction in one plane for alignment with said instrumentality.

13. In an upholstery installation, the combination of a frame, an upholstered backing and a fastener securing said frame and backing together, said fastener comprising a stud secured to one part of said installation, stud-receiving means on the other part of said installation receiving said stud, the securing means for said stud permitting it to be freely shifted in any direction in one plane for alignment with said stud-receiving means.

14. In an upholstery installation, the combination of a frame, an upholstered backing of relatively stiff material and snap fastener means securing the upholstered backing to the frame, said fastener means comprising stud-receiving means provided in the frame and a stud member having a base embedded within the upholstered backing, said stud member having a head, neck and shank portion extending from said base, through an aperture in the backing, the head being engaged with the stud-receiving means in the frame, and said aperture in the backing being substantially larger in cross-section than the cross-section of the shank, so that the stud may be freely shifted in any direction in one plane for alignment with said stud-receiving means.

15. An upholstered part including a backing having a plurality of apertures spaced about and adjacent the periphery thereof and a plurality of studs each having a projection extending from a base flange, the projections passing through said apertures and projecting at the opposite side of said backing from the base flanges, the cross-sectional area of each of said projections being substantially less than the cross-sectional area of the aperture in the backing through which it passes, thereby permitting transverse movement of the studs in any direction in one plane relative to the backing.

16. An upholstered part comprising, in combination, a relatively stiff backing having an aperture therethrough, a stud having a base flange larger than said aperture, a protruding stud portion projecting from said base flange and presenting a head, a neck and a shank, said shank located in the plane of said backing and being of a size substantially smaller than said aperture, said head and neck of said stud projecting from the opposite side of said backing from which said base flange is located, whereby said stud may shift laterally in any direction relative to said backing to compensate for errors in alignment with a cooperating stud-receiving part presented by a frame to which the upholstered part may be attached.

17. The combination with a frame or panel having a hole therein, and upholstery, of a fastener connected to and carried by said upholstery, the upholstery having an enlarged opening for receiving the fastener to permit it to have free lateral movement in all directions with reference thereto, said fastener adapted by such movement to be aligned with and engaged in said hole to secure the upholstery to said panel or frame.

18. The combination with frame or panel and upholstery parts, of a fastener element associated with one of these parts and a cooperating seat element associated with the other, said fastener having a compressible end portion to engage in said seat, one of said elements being mounted on and carried by its associated part by means permitting it to be shiftable laterally in any direction with relation to said part to facilitate alignment with the other of said elements.

19. The combination with a frame or panel and upholstery to be applied thereto, of a fastening device including male and female members respectively associated with said frame or panel and upholstery, one of said fastener members being mounted on its associated part by a lost motion connection to permit it to be shiftable laterally in any direction with reference to its mounting to facilitate alignment with the other of said members.

20. An upholstery installation comprising, in combination, a frame presenting a plurality of stud-receiving apertures, an upholstered backing for covering said frame, said backing presenting a plurality of stud units mounted in enlarged openings therein to permit lateral shifting thereof in any direction in one plane, said stud units having contractible and expansible socket-engaging heads at one face of said backing and attaching means at the other face of said backing to position said stud units upon said backing, whereby said socket-engaging heads are shiftable relative to said backing for alignment and engagement with said apertures.

In testimony whereof, I hereunto affix my signature.

JOSEPH LEDWINKA.